3,152,389
Patented Oct. 13, 1964

3,152,389
METAL COMPOSITION
Guy B. Alexander and Paul C. Yates, Brandywine Hundred, Del., assignors to E. I. du Pont de Nemours and Company, Wilmington, Del., a corporation of Delaware
No Drawing. Filed May 9, 1960, Ser. No. 27,469
13 Claims. (Cl. 29—182.5)

This invention relates to modifying high-melting metals with dispersed refractory metal oxides. More particularly the invention is directed to such modified compositions comprising a dispersion, in a metal (*a*) having a melting point above 1200° C. and having an oxide with a free energy of formation at 27° C. of from 87 to 105 kilocalories per gram atom of oxygen in the oxide, of a refractory metal oxide (*b*) which is stable up to 1000° C. and has a melting point above 1000° C. and a free energy of formation at 1000° C. above about 100 kilocalories per gram atom of oxygen in the oxide, said refractory oxide being in the form of substantially discrete particles having an average dimension of 5 to 500 millimicrons, the dispersion being in the form of a powder, the particles of which have a density in the range of 80 to 100% of theoretical density, have an oxygen content, in excess of oxygen in said refractory metal oxide particles, of from 0 to 2% by weight, and the metal in which is in the form of grains smaller than 10 microns. The invention is further particularly directed to the solid metal products containing dispersed refractory oxide particles, said products being produced by solidifying the novel metal powders.

Processes useful for producing the powder compositions comprise forming a coating of a compound of a metal in an oxidized state, the metal being one having an oxide with a free energy of formation at 27° C. of 87 to 105 kilocalories per gram atom of oxygen in the oxide, said coating being formed around particles of refractory metal oxide (*b*), the particles being substantially discrete and having an average dimension of 5 to 500 millimicrons, thereafter dispersing the compound-coated refractory oxide particles in a molten salt, adding a reducing metal selected from the group consisting of alkali and alkaline earth metals while maintaining the temperature of the molten salt in the range from 400 to 1200° C., the proportion of reducing metal being at least stoichiometrically equivalent to the oxidizing element of the coating on the refractory oxide particles, whereby the coating is reduced to metal, and separating the resulting metal-coated refractory oxide particles as a powder from the salt and the other products of the reduction reaction. Processes for forming solid metal products containing said dispersed oxides comprise compacting the novel powder compositions to substantially theoretical density.

The so-called "super alloys" have been developed for service at extremely high temperatures under very high stress and strain and with the maximum possible service life. In each of these directions, however, substantial additional improvement is greatly desired. An object of the present invention is to provide metal compositions having improved properties in one or more of these respects.

It has been suggested that such improvement might be accomplished by dispersing metal oxides in the metals, but no practical means for effecting such dispersion has heretofore been available. If one attempts to grind a solid, dense mass of the oxide and disperse the ground oxide in the metal, the dispersion contains particles which are far too large to be effective, since if a large enough number of particles is used, the metal product lacks ductility. It is impossible by known means to grind hard materials, such as refractory oxides, to a size smaller than about one micron.

If, on the other hand, one precipitates the refractory oxide as aggregates of particles which, individually and in their non-aggregated state are of colloidal size, and then attempts to coat the aggregates with metal, one finds that the metal merely envelops the aggregate as an outer skin and does not penetrate adequately into the aggregate. The particle density of such products is substantially less than 80 percent of theoretical, and they are extremely difficult, if not impossible, to compact into solid metals. A further object of the present invention is to provide refractory metal oxide particles dispersed in metals in the form of powders, wherein the density is about from 80 to 100 percent of theoretical. Further objects will become evident hereinafter.

Now according to the present invention, it has been found that the foregoing and other objects can be accomplished by compositions comprising dispersions, in certain high-melting metals, of very refractory metal oxide particles, provided the dispersed particles are substantially discrete, have an average dimension of 5 to 500 millimicrons, and are substantially completely in contact with the high-melting metal so that the density is very close to theoretical. The dispersed refractory oxide particles must be properly selected both as to chemical constitution and physical characteristics, in order to be operative in the process and to give ultimate products having the desired improvement in properties. The metal in the aggregate must also be selected with regard to its chemical characteristics if compositions of the invention are to be attained. The compositions can be in the form of powders suitable for use in powder metallurgy, or in the form of solid metal compositions produced by compacting the powders.

The processes which are useful for producing compositions as just described, comprise forming a coating of a compound of the metal ultimately to be produced in metallic form, said compound containing the metal in an oxidized state, the coating being formed around the suitable refractory oxide particles, thereafter dispersing the coated particles in a molten salt bath, adding a reducing metal to the salt bath under conditions which effect reduction of the metal compound to the corresponding metal, and separating the metal-refractory oxide aggregates thus formed from the salt and other products of the reduction reaction, whereby the product is recovered as a powder. The powder can be compacted to solid metal having substantially improved high-temperature properties.

For convenience in describing this invention certain abbreviations will be used. Free energy of formation will be kilocalories per gram atom of oxygen in the oxide, as determined at 27° C. unless otherwise specified, and will be called ΔF. Surface areas of the refractory oxides will be in terms of square meters per gram, and particle diameters will be millimicrons, abbreviated mμ. Particle densities will be grams per milliliter. The particulate refractory oxide will sometimes be referred to as the filler.

THE REFRACTORY OXIDE PARTICLES

The refractory oxide employed as a starting material is one which is relatively non-reducible—that is, an oxide which is not easily reduced by the reducing metal subsequently to be added, especially at the temperature of the fused salt bath. The free energy of formation at 1000° C. of refractory oxides is an indication of their ease of reducibility, the higher the ΔF, the less reducible the oxide. The reduction conditions in the fused salt bath are so rigorous that only refractory metal oxides having a ΔF, at 1000° C., above 100 kilocalories are suitable.

It will be apparent that the refractory oxide itself can be used as the starting material or the oxide can be formed during the process, as by heating another metal-oxygen-containing material. For instance, calcium oxide suitable for use as the refractory can be formed in situ by heating calcium carbonate. The metal-oxygen-containing material can, for example, be selected from the group consisting of oxides, carbonates, oxalates, and, in general, compounds which, after heating to constant weight at 1500° C., are refractory metal oxides. The ultimate oxide must have a melting point above 1000° C. A material with a melting point in this range is referred to as "refractory"—that is, difficult to fuse. Particles which melt or sinter at lower temperatures become aggregated.

The refractory can be a mixed oxide, particularly one in which each oxide conforms to the melting point and ΔF stated above. Thus, the refractory can be a single metal oxide or a reaction product of two or more metal oxides, preferably each of which is useful alone.

Typical single oxide refractories are calcium oxide, thoria, magnesia and the rare earth oxides including didymium oxide. A more complete list of suitable oxides, together with their free energies of formation is shown below.

| Oxide: | ΔF at 1000° C. |
|---|---|
| $Y_2O_3$ | 125 |
| CaO | 122 |
| $La_2O_3$ | 121 |
| BeO | 120 |
| $ThO_2$ | 119 |
| MgO | 112 |
| $UO_2$ | 105 |
| $HfO_2$ | 105 |
| $CeO_2$ | 105 |
| $Al_2O_3$ | 104 |
| $ZrO_2$ | 100 |

The refractory oxide must initially be in a finely divided state. The substantially discrete particles should have an average dimension in the size range of 5 to 500 mμ, an especially preferred range being from 5 to 250 mμ with a minimum of 10 mμ being even more preferred. (Note that 250 mμ particles have a surface area of $24/d$, and 10 mμ, of $600/d$.)

Powders of refractory oxides prepared by burning the corresponding metal chlorides, as, for example, by burning zirconium tetrachloride or thorium tetrachloride, to the oxide, are also very useful if the oxides are obtained primarily as discrete, individual particles, or aggregated structures which can be dispersed to such particles. However, because colloidal metal oxide aquasols already contain particles in the most desirable size range and state of subdivision, these are preferred starting materials for use in the compositions and processes of the invention.

The art is familiar with various methods for producing aquasols of colloidal metal oxides. The preparation of sols as described by Weiser in "Inorganic Colloidal Chemistry," vol. 2, "Hydrous Oxides and Hydroxides," for example, can be used to advantage. For instance, at page 177 of the 1935 edition there is described the preparation of a beryllia aquasol which can be used in the novel processes and product.

Especially preferred as starting materials are thoria aquasols prepared by hydrolyzing thorium nitrate.

The refractory particles should be dense and anhydrous for best results, but aggregates of smaller particles can be used, provided the discrete particles of aggregate have the above-mentioned dimensions. Particles which are substantially spheroidal or cubical in shape are also preferred, although anisotropic particles such as fibers or platelets can be used for special effects.

The size of a particle is given as an average dimension. For anisotropic particles the size is considered to be one third of the sum of the three particle dimensions. For example, a fiber of alumina might be 500 mμ long but only 10 mμ wide and thick. The size of this particle is $$\frac{500+10+10}{3}$$

or 173 mμ, and hence within the limits of this invention.

The initial refractory oxide preferably should not only have the particle size as above stated but also should have a surface area, in square meters per gram of from $12/d$ to $1200/d$, where $d$ is the density of the particles in grams per milliliter. For instance, thoria particles have a density of 9.7 grams/milliliter; hence when thoria is used it should have a surface area from 1.2 to 124 square meters per gram.

The refractory oxide must be relatively insoluble in the metal of the ultimate aggregate. If the refractory oxide dissolved, it would, of course, lose its necessary physical characteristics and become valueless for its intended use.

Similarly, the refractory oxide must be thermally stable to at least 1000° C. Again, if the oxide decomposed upon heating, it would lose its physical and chemical identity, and since the products of the invention are intended for use at elevated temperatures, this limitation as to thermal stability is essential.

THE METAL OF THE DISPERSION

The metal associated with the refractory oxide particles in a dispersion of this invention is one having a very high melting point and having an oxide with a relatively high free energy of formation at 27° C. Metals in this category are not readily amenable to formation by reduction from their compounds in which they are present in an oxidized state; however, they are easily prepared by the processes herein disclosed.

The metals included in this group have a melting point above 1200° C. and have an oxide with a free energy of formation at 27° C. of from 87 to 105 kilocalories. The group includes manganese, niobium, silicon, tantalum, titanium, and vanadium. The oxides of these metals, and their free energies of formation at 27° C. are shown in the following table:

| Metal | Oxide | ΔF at 27° C. |
|---|---|---|
| Manganese | MnO | 87 |
| Niobium | $NbO_2$ | 90 |
| Silicon | $SiO_2$ | 98 |
| Tantalum | $Ta_2O_5$ | 92 |
| Titanium | $TiO_2$ | 103 |
| Vanadium | VO | 99 |

COATING THE REFRACTORY WITH METAL COMPOUND

Having selected a refractory oxide filler as above described, one coats the filler particles with a compound of the selected metal in an oxidized state, the coating being formed around the individual particles of the refractory oxide.

The method used for coating the refractory particles with the compound must be one which will not cause the particles to agglomerate or to grow to a size outside the stated range. With the high-melting metals here involved, it is essential that the refractory have the properties as already described above.

The compound of the metal can be the oxide, hydroxide, hydrous oxide, oxycarbonate, hydroxycarbonate, or any other compound in which the metal is in an oxidized state. Since the compounds just mentioned, as precipitated, usually contain varying amounts of water, they will hereinafter be referred to generally as hydrous, oxygen-containing compounds of the metal.

The precipitated metal compound used in making a composition of the invention can be one of a single metal or of two or more metals, at least one of which is of the group above identified. For example, the hydrous oxides of both chromium and titanium can be deposited around the refractory particles. In the latter case, an alloy of chromium and titanium is produced directly, during the reduction step.

In the processes, compounds of other oxidized metals, in addition to the class above mentioned, can be used. Thus, the invention includes other metals whose oxides have a free energy of formation at 27° C. less than 105 kilocalories, in combination with manganese, niobium, silicon, tantalum, titanium, or vanadium.

Hydrous, oxygen-containing compounds of the metals can be precipitated from solutions in which they are present as the corresponding soluble salt. For example, the salt can be a nitrate, chloride, sulfate, or acetate; thus chromium nitrate, chromium chloride, titanium chloride, vanadium chloride, and sodium silicate are among the suitable starting materials.

Methods for precipitating oxygen-containing metal compounds from solutions of the corresponding metal salts are well known in the art and any such method can be used. For instance, an alkali can be added to a solution of the metal nitrate. When, on the other hand, the metal is in the form of a basic salt, such as sodium silicate, the precipitation can be effected by acidifying.

A preferred method for surrounding the refractory particles with the oxygen-containing compound of the metal is to coprecipitate the refractory particles from a colloidal aquasol simultaneously with the precipitation of the metal compound. One convenient way to do this is to add, simultaneously but separately, a solution of the soluble metal salt, a colloidal aquasol containing the refractory particles, and an alkali such as sodium hydroxide, to a heel of water. Alternatively, a dispersion containing the refractory particles can be used as a heel and the metal salt solution and alkali added simultaneously but separately thereto.

During such a coprecipitation process certain precautions are preferably observed. It is preferred not to coagulate or gel the refractory particles. Coagulation and gelation are avoided by working in dilute solutions, or by simultaneously adding the refractory and the metal salt solution to a heel.

The refractory particles should be completely surrounded with the precipitated, reducible metal compound, so that when reduction occurs later in the process, aggregation and coalescence of the refractory particles is avoided. In other words, the particles of the refractory are discrete and are not in contact, one with another, in the coprecipitated product. Vigorous mixing and agitation during the coprecipitation helps to insure the desired result.

After depositing the insoluble metal compound on the filler, any salts present are removed, as by washing. When one uses an alkali such as sodium hydroxide, potassium hydroxide, lithium hydroxide, ammonium hydroxide, or tetramethylammonium hydroxide to effect precipitation, salts such as sodium nitrate, ammonium nitrate or potassium nitrate are formed. These should be removed. One of the advantages of using the nitrate salts in combination with aqueous ammonia is that ammonium nitrate is volatile and therefore is easily removed from the product.

A very practical way to remove salts is by filtering off the precipitate and washing it on the filter or repulping the filter cake and again filtering.

After removing soluble salts the product is dried, preferably at ultimate temperatures above 100° C. Alternatively, the product can be dried, and the dry material suspended in water to remove the soluble salts, and the product thereafter redried.

The relative amount of insoluble metal compound deposited upon the refractory particles depends in part on the nature of the end product which it is desired to produce. For example, if the product is to be reduced and compacted directly to a dense mass of metal, then from 0.5 to 10 volume percent of refractory in the metal composition is a preferred range, and 1 to 5 volume percent is even more preferred. On the other hand, if the product is to be used as a masterbatch, as, for example, for blending with a considerable quantity of unmodified metal powder before compaction, then considerably higher volume loadings can be used.

Volume loadings as high as 30 percent, that is, one volume of oxide for each 2½ volumes of metal present, can be prepared, but such products tend to be pyrophoric. With compositions that are thus highly loaded, special precautions must be observed during the reduction step.

REDUCTION OF THE COATING ON THE REFRACTORY

Having deposited on the refractory particles the precipitate of compound of metal in oxidized state, and washed and dried the product, the next step is to reduce the metal compound to the corresponding metal. This is done by subjecting the coated particles to a metal reducing agent in a fused salt bath. The compound-coated refractory oxide particles are dispersed in the molten salt and the reducing metal is added while maintaining the temperature of the molten salt in the range of 400 to 1200° C.

The fused salt bath is merely a medium whereby to effect contact of the reducing agent and the metal compound under conditions which will not affect the disposition of the compound with respect to the refractory particles. It can comprise any suitable salt or mixture of salts having the necessary stability, fusion point, and the like.

Suitable fused salt baths can comprise halides of metals selected from Groups I and IIa of the Periodic Table. In general, the chlorides and fluorides are preferred halides. Bromides or iodides can be used, although their stability at elevated temperatures is frequently insufficient. Chlorides are especially preferred. Thus, among the preferred salts are calcium chloride, sodium chloride, potassium chloride, barium chloride, strontium chloride, and lithium chloride and fluoride.

The fused salt bath will usually be operated under a blanket of either an inert gas or a reducing gas. Such gases as helium, argon, or hydrogen gases can be used in this capacity.

The temperature of the reduction can be varied considerably, depending upon the combination of fused salt and reducing metal selected. In general, the temperature of reduction will be between 400 and 1200° C. It is usually preferred to select a reduction temperature at which the reducing metal, as well as the fused salt, is present in a molten state. Usually the operating temperature will also be below the boiling point of the reducing metal employed.

The operating temperature of the reduction bath must also be below the melting point of the metal coating to be produced on the refractory filler. For example, if a tungsten compound is being reduced upon particles of thoria, reduction temperatures as high as 1200° C. can be employed. However, if a copper-containing alloy having a low melting point is being produced, the reduction temperature should be maintained below that of the melting point of the copper alloy.

The reducing metal is selected from the group consisting of alkali and alkaline earth metals. Thus, the metal can be lithium, sodium, potassium, rubidium, caesium, beryllium, magnesium, calcium, strontium, or barium.

Within this group of reducing metals, the particular metal is selected by comparison of the $\Delta F$ of its oxide with that of the metal oxide to be reduced. The said $\Delta F$ must be greater than that of the metal oxide being reduced. If it is less than the $\Delta F$ of the particulate refractory, excess reducing metal will ordinarily not be objectionable. If, however, the $\Delta F$ of the oxide of the reducing metal is greater than the $\Delta F$ of the particulate refractory, only the stoichiometric proportion of metal required to reduce the metal oxide should be used.

It is preferred to use a reducing metal which has a low solubility in the solid state with respect to the metal of the coating on the refractory oxide particles; otherwise, one will get undesirable alloying of the reducing metal with the metal formed by the reduction. For this reason, calcium and sodium are suitable for reducing compounds of such metals as iron, cobalt, nickel, chromium, or tungsten, while magesium and sodium are useful in reducing titanium.

It is preferable to use a temperature of reduction at which the reduction reaction proceeds at a rapid rate. For reducing cobalt, iron, and nickel compounds, temperatures in the range of 600 to 800° C. are suitable. With compounds of metals such as chromium, titanium, and niobium, temperatures in the range of 850 to 100° C. are used.

Completion of the reduction reaction can be determined by taking samples from the melt, separating the product from the fused salt, and analyzing for oxygen by ordinary analytical procedures such as vacuum fusion. The reduction is continued until the oxygen content of the mass is substantially reduced to zero, exclusive of the oxygen of the oxide refractory material. In any case, the oxygen content of the product, exclusive of the oxygen in the refractory, should be broadly in the range of from 0 to 2% and preferably from 0 to 0.5%, with 0 to 0.1%, based on the weight of the product, being specifically preferred. In the case of niobium alloys the excess oxygen desirably should be substantially zero—that is, less than 0.05%.

The reduced product is present as a suspension in the fused salt bath. It can be separated therefrom by the techniques ordinarily used for removing suspended materials from liquids. Gravitational methods such as settling, centrifuging, decanting and the like can be used, or the product can be filtered off. Alternatively, the bath can be cooled and the fused salt dissolved in a suitable solvent such as dilute aqueous nitric acid or acetic acid.

If a considerable excess of reducing metal is used in the reduction step, it may be necessary to use a solvent less reactive than water for the isolation procedure. In such a case, methyl or ethyl alcohol is satisfactory. The presence of a small amount of acid in the isolation solvent will dissolve any insoluble oxides formed by reaction between the reducing metal and the oxygen content of the coating being reduced. After filtering off the reduced metal powder, it can be dried to free it of residual solvent.

COMPACTING THE POWDER

In a further aspect of the invention, the powder prepared as above described is compacted to a solid metalliferous product. This can be done by compacting the powder to a dense mass, as by pressing in a die, by extruding, by rolling, or by any of the techniques used in powder metallurgy. The compacted mass of metal should have a density upwards of 95 percent of theoretical, preferably upwards of 98 percent. The "green" compact formed can be sintered, as at temperatures up to 90 percent of its melting point for up to 24 hours, to give it sufficient strength to hold together during subsequent working operations. Preferably, such sintering is effected in an atmosphere of clean, dry hydrogen.

Th formed body so obained can be subjected to intensive working, preferably at elevated temperatures. The working forces should be sufficient to effect plastic flow in the metals. Working should be continued until homogenization of the refractory oxide-metal grains is substantially complete. Homogeneity can be determined by metallographic and chemical analyses. Because the refractory oxide in the metal originally was present as substantially discrete particles, the worked metal product is characteristically substantially free of "fibering"—that is, alignment of refractory particles in the direction of working.

While working can be accomplished by such methods as swaging, forging, and rolling, it is especially preferred to effect working by extruding the above-mentioned green compact through a die under extreme pressure, at temperatures approaching the melting point of the metal present—say, from 85 to 95% of the melting temperature in degrees absolute. Because the compositions of the invention are very hard, the working conditions needed are much more severe than for the unmodified metals. In the case of extrusion of a billet, the reduction in cross-sectional area preferably is upwards of 90%. Welding of the metal grains becomes nearly complete.

THE NOVEL POWDERS

The novel powders are metalliferous compositions comprising a dispersion of the refractory oxide particles in a metal having a melting point above 1200° C. and having oxide with a free energy of formation at 27° C. of from 87 to 105 kilocalories per gram atom of oxygen in the oxide, the powder having a density in the range of 80 to 100% of theoretical density, having an oxygen content, in excess of oxygen in said refractory metal oxide particles, of from 0 to 2% by weight, and the metal in which is in the form of grains smaller than 10 microns. In preferred compositions the density is from 91 to 100% of theory and in the most preferred products is from 96 to 100% of theory.

In preferred products of the invention the surface area is such that the powders are not pyrophoric—that is, the surface is from $$\frac{6.0}{d} \text{ to } \frac{.012}{d} \text{ square meters per gram}$$

where $d$ is the density of the powder in grams per milliliter.

The density of the powder can be measured according to conventional analytical procedures. Thus, a small portion of water is added to a volumetric flask, the weighed sample is added, air is evacuated, and water is added to the calibrated mark. The volume of the sample is the volume of the flask minus the volume of water added (see Kolthoff and Sandell, "Textbook of Quantitative Inorganic Analysis," MacMillan Company, 1936, at page 640). The theoretical density is calculated from the analysis of the metal and the refractory and the densities of each. The calculation is based on the known analysis and the densities of the components, assuming the volumes of each are additive.

In the novel compositions, the particles of the refractory filler are substantially completely surrounded by a coating of metal, which maintains them separate and discrete. The particles are isolated and do not come in contact with each other. Thus, coalescence and sintering of the particles is prevented. In other words, the compositions comprise a continuous phase of metal containing dispersed therein the refractory oxide particles.

THE NOVEL SOLID METALS

The solid metal products of the invention are characterized by their high density—that is, by the fact that the densities are upwards of 96 percent of theoretical and can be substantially 100 percent of theoretical. This is a direct consequence of the employment of the powders in the prepartion of such solid products, since by reason of their methods of preparation of the powders are substantially free of voids. In compacting powders to solid metals it would, of course, be possible to introduce voids by insufficient compaction or working, but the art is familiar with this problem and is acquainted with techniques whereby it can be avoided.

The solid metal products are further characterized in that they are substantially free of fibering of the dispersed refractory oxide. This is a consequence of their novel process of preparation, wherein the oxide is first dispersed with respect to the metal and the dispersion is compacted by working. Fibering is a result of agglomerated particles being fragmented during working, as by extrusion; the fragments show a definite and easily discernible alignment. Such alignment gives a starting point for crack propagation and ultimately leads to failure of the metal under stress, especially at high temperatures. Its avoidance is a distinct advantage of the novel solid compositions.

The solid products are also distinguished from the corresponding unmodified metal products by their exceptional mechanical properties at elevated temperatures. For example, the creep rates of the modified products are from one-tenth to as low as 1/100 of those of the unmodified metals when compared at elevated temperatures.

The stress which the modified metals will support over a period of time at high service temperatures is at least two to five times larger than that of the unmodified metals. The resistance of the refractory oxide-modified metals to long-term deformation under relatively low stress can be as much as ten thousand times better than that of the corresponding unmodified metals. Not only are the products strong, but they are ductile, readily machineable, and show considerable elongation under stress, up to 90 percent of that of the unmodified metal.

Incorporation of the dispersed refractory particles into the solid metals according to the invention substantially improves the yield strength of the metal while retaining sufficient ductility, as measured by the elongation, for all practical purposes. If $Y_m$ is the yield strength of the modified material at 0.2 percent offset, $Y_c$ is the corresponding yield strength of the control, the following relationship holds at temperatures up to 75 percent of the melting point of the metal in degrees absolute:

$$\frac{Y_m}{Y_c} = \text{greater than } 1.5:1$$

The powdered products of this invention are useful in powder metallurgy processes. The solid metals made therefrom are useful as materials of construction, especially in application involving extended use at elevated temperatures. For example, turbine blades and other components of high-temperature power plants, aircraft skins, high-speed cutting tools, electrical heating elements, etc. can advantageously be fabricated from the refractory oxide-filled metals.

The products of the invention can also be used as alloying agents with other metals.

The invention will be better understood by reference to the following illustrative examples:

Example 1

This example describes the preparation of a niobium-thoria composition of the invention by coprecipitating niobium oxycarbonate and colloidal thoria and reducing the oxycarbonate with calcium metal in a fused salt bath.

The reactor used to deposit the niobium oxycarbonate on the colloidal thoria consisted of a stainless steel tank with a conical bottom. The bottom of the tank was attached to a stainless steel circulating line, to which there were attached three inlet pipes through T's. The circulating line passed through a centrifugal pump and thence returned to the tank.

Initially, the tank was charged with 10 gallons of water, which was about 1/3 of the capacity of the tank. Three feed solutions were prepared as follows: (a) An aqueous niobium chloride solution, (b) an aqueous ammonium carbonate solution, and (c) a colloidal aquasol containing 3 percent thoria, in the form of 5 to 10 millimicron discrete particles. These three feed solutions were metered in through calibrated liquid flowmeters at equal rates into the circulating stream, which initially consisted of water. The pH of the slurry in the tank was maintained between 7.0 and 8.0 during the run, and was 7.6 at the end of the run. The time of addition of the reactants was 40 minutes, the reactants being added at room temperature.

The resulting slurry contained precipitated particles which consisted of hydrous, niobium oxycarbonate and colloidal thoria. This precipitate was filtered, and washed with water to remove most of the soluble salt. It was then dried for 40 hours at 250° C. and micropulverized, to give a product which passed 100 mesh. This powder was dried overnight at 650° C., and then heated for three hours at 850° C.

The product thus obtained was reduced by treating it with calcium metal in a fused salt bath. The reactor consisted of a chromium plated Inconel vessel, equipped with a stirrer and a thermocouple well. The atmosphere in the vessel was purified argon, the argon having been completely dried and freed of oxygen and nitrogen by passing it through an alumina drying tube, then passing it over chromium metal chips, and finally over titanium-zirconium chips, the chips being maintained at a temperature of about 850° C.

The reactor was charged with about 500 grams of molten calcium chloride. The reaction was conducted under substantially stoichiometric conditions; thus, increments of calcium pellets, consisting of pure calcium metal, were added alternately with increments of thoria-niobia dispersion. Simultaneously with the addition of the niobia-thoria there was added 100 grams of cold anhydrous calcium chloride. The calcium chloride served to absorb the heat which was liberated during the reduction reaction. This reaction proceeded essentially under isothermal conditions, the temperature being in the range of 850° to 900° C.

After all the niobia in the coating had been reduced, enough calcium was added to the fused salt mixture to scavenge any remaining oxygen. Finally, the fused salt mixture was cooled under an argon atmosphere.

The product was isolated by leaching the salt, calcium oxide, and excess calcium mixture with a 5 percent acetic acid-water solution. The metal powder so obtained was washed with dilute acetic acid, water, and finally acetone, and was dried in a vacuum oven at 70° C. The powder obtained consisted of particles 100 to 200 mesh in size.

The product had a surface area of 0.05 m.²/g., and it was not pyrophoric, i.e., it showed no tendency to heat up when exposed to the air. The thoria particles in the product had a number average particle size of 50 millimicrons.

Example 2

A procedure substantially identical with that used in Example 1 is used to prepare dispersions of $ThO_2$ in titania and vanadium oxide. The thoria colloid is metered in with the appropriate water soluble salts (e.g., basic titanium chloride, etc.) and precipitated with a suitable precipitating agent. The product is then dried and reduced in a fused salt bath.

The reduction conditions for the vanadium masterbatch are quite similar to those used for niobium. The isolation technique employed is also similar. Substantially theoretical yields of $ThO_2$-filled vanadium can be obtained. X-ray line-broadening studies show that the $ThO_2$ is still well within the colloidal size range.

Somewhat more severe reduction conditions are employed in reducing the titania containing dispersed thoria. The temperature is raised to 1000° C. for this reaction. The stoichiometric procedure is employed. The thoria particles in titanium recovered after this reaction are somewhat larger than in the case of vanadium and niobium. Their average particle size is about 0.5 micron.

Example 3

This is an example of a molybdenum-silicon-thoria composition of the invention. This product is typical of a series of molybdenum-silicon alloys containing, for example, from 16 to 40% silicon. Such alloys containing thoria have increased resistance to oxidation at elevated temperatures. The alloy of this example containing thoria was prepared by coprecipitating $CaMoO_4 \cdot 2SiO_2$ with colloidal thoria, and reducing the coprecipitate in fused $CaCl_2$ with Ca.

The coprecipitate was prepared from four feed solutions: (a) 410 g. $CaCl_2$ in 2 liters $H_2O$, (b) 1350 g. "Ludox" colloidal silica in 2 liters $H_2O$ (the silica sol contained 30% $SiO_2$), (c) 620 g. $(NH_4)_6Mo_7O_{24} \cdot 4H_2O$ and 550 ml. conc. $NH_4OH$ in 2 liters $H_2O$, and (d) 75 g. $ThO_2$ sol containing 24.1% solids in 2 liters $H_2O$.

The colloidal aquasol of $ThO_2$ was prepared by precipitating $Th(C_2O_4)_2$, igniting, and dispersing the resultant $ThO_2$ in dilute nitric acid. Particles of $ThO_2$ in this sol were discrete and 10 millimicrons in average diameter.

The four feed solutions were added simultaneously, but separately to a heel of 2 liters of water. The resulting precipitate was filtered, washed and dried at 150° C. It contained 2 mols of $SiO_2$ for each mol of $CaMoO_4$ and 3.22% $ThO_2$ by weight based on the expected molybdenum-silicon analysis.

The dried cake was broken and screened to yield a granular solid. This was fired at 950° C. to eliminate any $H_2O$ or other volatile components.

The dried granular product was next reduced with Ca. Thirteen hundred grams $CaCl_2$ was melted and heated to 900° C. in an Inconel pot. The pot was blanketed by clean, dry argon. To the pot increments of 32 parts granular product from above and 27.3 parts calcium were added. Ten additions were made over a period of 1 hour. During this time, the temperature was maintained in the range of 900 to 940° C. After the last addition, the $CaCl_2$ slurry was stirred for ½ hour at 900 to 910° C.

The pot was then cooled to room temperature and the fused salt broken into small lumps. These were added to ice water, the CaO was neutralized with HCl and the pH of the slurry adjusted to 5. The $Mo-Si-ThO_2$ product was recovered by centrifugation; it was reslurried and washed twice with water, and then added to 1 N NaOH and refluxed for 1 hour. It was again centrifuged and washed till the pH of the washings was 7–8, and finally dried in a vacuum oven at 90° C.

The product contained about 1% oxygen in excess of that in the filler. This level of oxygen lowers the impact strength of pressed solid bodies. Consequently, it is desirable to reduce this excess oxygen level. This can be done by blending the powder with the stoichiometric amount of carbon and heating the mixed powders in a clean, dry hydrogen atmosphere, preferably at reduced pressure. In this way, oxygen in excess of oxygen in the filler can be essentially eliminated.

The powdered product of this example was hot pressed to a dense bar using a graphite mold at 1600° C. and 3000 p.s.i. During this operation, the press was in an argon atmosphere. Such alloys can also be hot worked, as by hot rolling or extrusion at temperatures above about 1200° C.

The resulting molybdenum-silicon-thoria product had an extremely fine grain size, i.e., about 5 microns. This grain size persisted even after long heat treatment at 1500° C. The thoria particles in the alloy averaged 150 millimicrons in size. The bar was an improved heating element because of its oxidation resistance and impact strength (20 lbs. per square inch in a modified Olsen test), which was improved over $MoSi_2$ bars prepared from commercially available powders, hot pressed in the same way as above.

*Example 4*

This is an example of a titanium-molybdenum alloy containing colloidal thoria.

The alloy was made by a process similar to that in Example 3 using feeds as follows: (a) 1560 g. $TiCl_4$ solution containing 17% solids, prepared by adding $TiCl_4$ to ice cold water, (b) 317 g. ammonium molybdate in 1500 ml. $H_2O$, (c) 199 g. $CaCl_2$ in 1500 ml. of $H_2O$, and (d) 100 g. $ThO_2$ sol (24% solids) diluted to 1500 ml.

The feeds were added to 100 g. $H_2O$ in a stainless steel bucket over a period of 1 hour. The slurry was vigorously stirred during addition with an Eppenbach stirrer.

On filtering and drying at 220° C., 458 g. of product was obtained. It analyzed 24.2% $TiO_2$ and 48.3% $MoO_3$.

It was reduced in fused $CaCl_2$, using 10 g. of powder and the amount of Ca required to reduce the $TiO_2$ and $MoO_3$ in each charge. The product was a $Mo-Ti-ThO_2$ alloy, which upon examination with X-ray had an expanded Mo lattice. It contained 1.1% oxygen. The thoria in the product was about 250 millimicrons in size. The grain size of the metal was about 1 micron after hot pressing to 100% density and annealing at 1400° C. for 10 hours.

In a similar way, other titanium alloys, such as 82 Ni–15 Cr–3 Ti, 95.5 Ti–1.5 Fe–3 Cr, and 15 Cr–3 Ti–7 Fe–1 Nb–74 Ni can be prepared.

Alloys containing silicon, in addition to molybdenum and titanium can also be prepared, and are included in the products of the invention. In these alloys, small amounts of nitrogen may be present to advantage. In the case of chromium alloys, on the other hand, nitrogen and carbon are preferably kept to a minimum.

Usually, alloys of the high melting metals, like niobium, molybdenum, tungsten, and tantalum are difficult to prepare by powder blending because of the slow diffusion rates of these metals. In this invention, a pre-alloyed powder is produced, because all the components of the alloy are coprecipitated from aqueous solution, in a homogeneous precipitate, which on reduction gives a homogeneous alloy directly.

*Example 5*

This is an example of a product of the invention, said product being an alloy of 80 niobium–10 titanium–10 molybdenum containing 2% thoria.

The product was prepared by reducing a coprecipitate of $Nb_2O_5$, $TiO_2$, $Mo_2O_5$, and $ThO_2$ in a fused $CaCl_2$ salt bath with Ca.

The coprecipitate was prepared in a creased, 3-neck, 5 liter flask, by adding three feeds simultaneously and separately to a cooled heel of water.

The feeds were: (a) 697 g. of $NbCl_5$, 119 g. $TiCl_4$ and 85.3 g. $MoCl_5$ were added to 850 ml. of conc. HCl under a nitrogen purge, then the volume was adjusted to 1 liter with conc. HCl, (b) 31.9 g. of 24.1% $ThO_2$ sol (containing 10 millimicron colloidal particles of $ThO_2$) was diluted to 1 liter, (c) 1.6 liters of conc. $NH_4OH$. These feeds were added to a heel of 1 liter of distilled water over a period of 26 minutes. The reaction was blanketed with nitrogen. The precipitate was filtered, dried at 175° C. oven, and finally heated at 300–350° C. to eliminate $NH_4Cl$. The yield of mixed oxides was 432 g.

The coprecipitate was then reduced with metallic calcium, following the procedure of Example 3, to produce the alloy containing the dispersed thoria. Final traces of excess oxygen were removed by carbon reduction as indicated in Example 3. The exact amount of carbon required was determined by subtracting from (a) a total oxygen analysis, using the method of R. A. Yeaton, Vacuum, 2: 115 ("The Vacuum Fusion Technique as Applied to Analysis of Gases in Metals"), (b) the oxygent content from a $ThO_2$ analysis.

The grain size in an annealed (10 hrs. at 1400° C.), pressed product of this example was 3 microns.

Other niobium base alloys can be prepared using the above technique. Such alloys having at least 50% niobium, may also contain up to 15% titanium, 20% molybdenum and 35% tungsten. For example, these alloys include 64 Nb–10 Ti–6 Mo–20 W; 57 Nb–10 Ti–3 Mo–30 W; 60 Nb–10 Ti–30 W. Niobium zirconium alloys may also be prepared. In the case of niobium alloys, a filler having a free energy greater than 110 is preferred.

Ths application is a continuation-in-part of our copending application Serial No. 744,930, filed June 27, 1958, now abandoned.

We claim:

1. A composition consisting essentially of a dispersion, in a metal having a melting point above 1200° C. and having an oxide with a free energy of formation at 27° C. of from 87 to 105 kilocalories per gram atom of oxygen in the oxide, of about from 0.5 to 30% by volume of a refractory metal oxide which is stable up to 1000° C. and has a melting point above 1000° C. and a free energy of formation at 1000° C. above about 100 kilocalories per gram atom of oxygen in the oxide, said refractory oxide being in the form of substantially discrete particles having an average dimension of 5 to 500 millimicrons, the dispersion being in the form of a sintered powder, the particles of which have a density in the range of 80 to 100 percent of theoretical density, have an oxygen content, in excess of oxygen in said refractory metal oxide particles, of from 0 to 2% by weight, and the metal in which is in the form of grains smaller than 10 microns.

2. A composition of claim 1 in which the excess oxygen content is in the range of 0 to 0.1%.

3. A composition of claim 1 in which the refractory oxide is an oxide of a metal selected from the group consisting of yttrium, calcium, lanthanum, beryllium, thorium, magnesium, uranium, hafnium, cerium, aluminum, and zirconium.

4. A composition of claim 1 in which the powder has a surface area of from $$\frac{6}{d} \text{ to } \frac{.012}{d} \text{ square meters per gram}$$

where $d$ is the density of the powder particles in grams per milliliter.

5. A composition consisting essentially of a dispersion, in a metal having a melting point above 1200° C. and having an oxide with a free energy of formation at 27° C. of from 87 to 105 kilocalories per gram atom of oxygen in the oxide, of about from 0.5 to 10% by volume of a refractory metal oxide which is stable up to 1000° C. and has a melting point above 1000° C. and a free energy of formation at 1000° C. above about 100 kilocalories per gram atom of oxygen in the oxide, said refractory oxide being in the form of substantially discrete particles having an average dimension of 5 to 500 millimicrons, the dispersion being in the form of a sintered powder, the particles of which have a density in the range of 80 to 100 percent of theoretical density, have an oxygen content, in excess of oxygen in said refractory metal oxide particles, of from 0 to 2% weight, and the metal in which is in the form of grains smaller than 10 microns.

6. A composition consisting essentially of a dispersion, in a metal selected from the group consisting of metals having a melting point above 1200° C. and an oxide with a free energy of formation at 27° C. of from 87 to 105 kilocalories per gram atom of oxygen in the oxide and alloys of a said metal with another metal having an oxide with a free energy of formation at 27° C. of less than 105 kilocalories per gram atom of oxygen in the oxide, of about from 0.5 to 30% by volume of a refractory metal oxide which is stable up to 1000° C. and has a melting point above 1000° C. and a free energy of formation at 1000° C. above about 100 kilocalories per gram atom of oxygen in the oxide, said refractory oxide being in the form of substantially discrete particles having an average dimension of 5 to 500 millimicrons, the dispersion being in the form of a sintered powder, the particles of which have a density in the range of 80 to 100 percent of theoretical density, have an oxygen content, in excess of oxygen in said refractory metal oxide particles, of from 0 to 2% by weight, and the metal in which is in the form of grains smaller than 10 microns.

7. A composition consisting essentially of a dispersion, in a metal selected from the group consisting of manganese, niobium, silicon, tantalum, titanium, and vanadium, of about from 0.5 to 30% by volume of a refractory metal oxide which is stable up to 1000° C. and has a melting point above 1000° C. and a free energy of formation at 1000° C. above about 100 kilocalories per gram atom of oxygen in the oxide, said refractory oxide being in the form of substantially discrete particles having an average dimension of 5 to 500 millimicrons, the dispersion being in the form of a sintered power, the particles of which have a density in the range of 91 to 100 percent of theoretical density, have an oxygen content, in excess of oxygen in said refractory metal oxide particles of from 0 to 2% by weight, and the metal in which is in the form of grains smaller than 10 microns.

8. A composition of claim 7 in which the powder has a density in the range of 96 to 100% of theoretical density and a surface area of from $$\frac{6}{d} \text{ to } \frac{.012}{d} \text{ square meters per gram}$$

where $d$ is the density of the powder in grams per milliliter.

9. A solid, sintered, hot-worked, metalliferous composition consisting essentially of a dispersion, in a continuous phase of a metal having a grain size smaller than 10 microns and being selected from the group consisting of manganese, niobium, silicon, tantalum, titanium and vanadium of about from 0.5 to 30% by volume, of a refractory metal oxide which is stable up to 1000° C. and has a melting point above 1000° C. and a free energy of formation at 1000° C. above about 100 kilocalories per gram atom of oxygen in the oxide, said refractory oxide being in the form of substantially discrete particles having an average dimension of 5 to 500 millimicrons, the dispersion having an oxygen content, in excess of oxygen in said refractory oxide particles, of from 0 to 2% by weight, the refractory oxide particles being distributed in the metal substantially homogeneously both in the direction of working and transverse thereto, and the dispersion having a density in the range of 96 to 100% of theoretical density.

10. A composition of claim 9 in which the excess oxygen content is in the range of 0 to 0.1%.

11. A composition of claim 9 in which the refractory oxide is an oxide of a metal selected from the group consisting of yttrium, calcium, lanthanum, beryllium, thorium, magnesium, uranium, hafnium, cerium, aluminum, and zirconium.

12. A solid, sintered, hot-worked powder metallurgy metalliferous composition consisting essentially of a dispersion, in a continuous phase of a metal having a grain size smaller than 10 microns, said metal being an alloy of a metal selected from the group consisting of manganese, niobium, silicon, tantalum, titanium and vanadium, with another metal having an oxide with a free energy of formation at 27° C. of less than 105 kilocalories per gram atom of oxygen in the oxide, of from 0.5 to 30% by volume of a refractory metal oxide which is stable up to 1000° C. and has a melting point above 1000° C. and a free energy of formation at 1000° C. above about 100 kilocalories per gram atom of oxygen in the oxide, said refractory oxide being in the form of substantially discrete particles having an average dimension of 5 to 500 millimicrons, the dispersion having an oxygen content, in excess of oxygen in said refractory oxide particles, of from 0 to 2% by weight, the refractory oxide particles being distributed in the metal substantially homogeneously both in the direction of working and transverse thereto, and the dispersion having a density in the range of 96 to 100% of theoretical density.

13. A solid, sintered, hot-worked, metalliferous composition consisting essentially of a dispersion, in a continuous phase of a metal having a grain size smaller than 10 microns and being selected from the group consisting of manganese, niobium, silicon, tantalum, titanium, and vanadium, of about from 0.5 to 30% by volume of a refractory metal oxide which is an oxide of a metal selected from the group consisting of yttrium, calcium, lanthanum, beryllium, thorium, magnesium, uranium, hafnium, cerium, aluminum, and zirconium and is stable up to 1000° C., has a melting point above 1000° C., and a free energy of formation at 1000° C. above about 100 kilocalories per gram atom of oxygen in the oxide, the refractory oxide particles being distributed in the metal substantially homogeneously both in the direction of working and transverse thereto, and the dispersion having a density substantially 100% of theoretical density and an oxygen content, in excess of oxygen in said refractory metal oxide particles, of from 0 to 0.1% by weight.

References Cited in the file of this patent

UNITED STATES PATENTS

| | | |
|---|---|---|
| 2,656,596 | Contant et al. | Oct. 27, 1953 |
| 2,823,988 | Grant et al. | Feb. 18, 1958 |
| 2,949,358 | Alexander et al. | Aug. 16, 1960 |
| 3,066,391 | Vordahl | Dec. 4, 1962 |

FOREIGN PATENTS

| | | |
|---|---|---|
| 447,641 | Canada | Apr. 6, 1948 |